(12) United States Patent
Lim et al.

(10) Patent No.: US 12,485,741 B2
(45) Date of Patent: Dec. 2, 2025

(54) SEALING DEVICE AND IN-WHEEL MOTOR INCLUDING THE SAME

(71) Applicants: HYUNDAI MOTOR COMPANY, Seoul (KR); KIA CORPORATION, Seoul (KR)

(72) Inventors: Ki Tack Lim, Incheon (KR); Jae Young Jeun, Yongin-si (KR); Jeong Uk An, Suwon-si (KR); Kyung Ku Yeo, Gwangmyeong-si (KR); Kam Chun Lee, Seoul (KR); Yong Gyu Lee, Yongin-si (KR); Sung Min Hong, Seongnam-si (KR); Hong Wook Lee, Seongnam-si (KR); Kyung Jun Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 318 days.

(21) Appl. No.: 18/141,587

(22) Filed: May 1, 2023

(65) Prior Publication Data
US 2024/0140191 A1    May 2, 2024

(30) Foreign Application Priority Data
Nov. 1, 2022    (KR) .................. 10-2022-0143682

(51) Int. Cl.
*H02K 5/10*    (2006.01)
*B60K 7/00*    (2006.01)
*F16J 15/3232*    (2016.01)

(52) U.S. Cl.
CPC ......... *B60K 7/0007* (2013.01); *F16J 15/3232* (2013.01); *B60K 2007/0038* (2013.01)

(58) Field of Classification Search
CPC ............ B60K 7/0007; B60K 2007/0038; F16J 15/3232; F16J 15/3456; F16J 15/3256; H02K 5/10; H02K 1/27915; H02K 3/28; H02K 9/06; H02K 2201/03; H02K 7/006; B60Y 2200/91; B60Y 2400/60; Y02T 10/64

See application file for complete search history.

(56) References Cited

U.S. PATENT DOCUMENTS

| 8,122,987 B2 | 2/2012 | Murata et al. |
| 8,688,345 B2 | 4/2014 | Boughtwood |
| 8,688,346 B2 | 4/2014 | Boughtwood |

(Continued)

FOREIGN PATENT DOCUMENTS

| CN | 216783616 U | 6/2022 | |
| DE | 102013200117 A1 * | 7/2014 | ............. B60L 15/20 |

(Continued)

*Primary Examiner* — Justin Holmes
(74) *Attorney, Agent, or Firm* — Lempia Summerfield Katz LLC (57) ABSTRACT

The present disclosure provides a sealing device and an in-wheel motor including the sealing device. The in-wheel motor includes a stator, a rotor rotatably disposed with respect to the stator, an annular inner seal connected to the stator and spaced apart from the rotor by a predetermined gap so as to be disposed between the stator and the rotor, and an annular slinger coupled to an end portion of the rotor, wherein the annular inner seal seals between the slinger and the in-wheel motor.

22 Claims, 5 Drawing Sheets

(56) References Cited

U.S. PATENT DOCUMENTS

| | | |
|---|---|---|
| 9,065,304 B2 | 6/2015 | Boughtwood |
| 10,570,971 B2 * | 2/2020 | Naitou et al. |
| 12,005,785 B2 * | 6/2024 | Yada ........................ F16J 15/10 |
| 2006/0018579 A1 * | 1/2006 | Yamamoto .......... F16C 33/7823 |
| | | 384/484 |
| 2010/0138127 A1 | 6/2010 | Boughtwood |
| 2010/0163319 A1 | 7/2010 | Murata et al. |
| 2013/0049498 A1 | 2/2013 | Boughtwood |
| 2013/0134839 A1 | 5/2013 | Boughtwood |
| 2018/0252278 A1 | 9/2018 | Naitou et al. |
| 2021/0104942 A1 | 4/2021 | Katsuta |

FOREIGN PATENT DOCUMENTS

| | | | |
|---|---|---|---|
| EP | 2658096 B1 | 4/2022 | |
| JP | H0775994 B2 | 8/1995 | |
| JP | 2008032067 A * | 2/2008 | ............ F16C 19/386 |
| JP | 4697792 B2 * | 6/2011 | ............. B60B 27/00 |
| JP | 5179841 B2 * | 4/2013 | ............. B60B 27/00 |
| JP | 6136903 B2 | 5/2017 | |
| JP | 6731474 B2 | 7/2020 | |
| KR | 101080664 B1 | 11/2011 | |
| WO | WO-2020209404 A1 * | 10/2020 | ......... B60B 27/0073 |

\* cited by examiner

SEALING DEVICE AND IN-WHEEL MOTOR INCLUDING THE SAME

CROSS-REFERENCE TO RELATED APPLICATION

This application claims the benefit of and priority under 35 U.S.C. § 119(a) to Korean Patent Application No. 10-2022-0143682, filed on Nov. 1, 2022, the entire contents of which are incorporated herein by reference.

BACKGROUND (a) Technical Field

The present disclosure relates to a sealing device and an in-wheel motor including the same.

(b) Background Art

Recently, an electric vehicle driven by a motor instead of an engine has received great attention. Generally, an electric vehicle is driven by one or two large motors. Alternatively, an in-wheel motor, which is widely adopted in small vehicles, such as an electric bicycle and a scooter, is used in an electric vehicle.

An in-wheel motor is an electric motor that is mounted in a wheel of a vehicle and is configured to directly rotate the wheel. Specifically, in an electric vehicle driven by an in-wheel motor, a small motor is mounted in each wheel to independently drive and control each wheel.

An electric vehicle in which an in-wheel motor is adopted may provide advantages, such as excellent space utilization and improved control performance compared to an electric vehicle in which an existing large motor is adopted. However, the electric vehicle driven by the in-wheel motor must be able to satisfy various design conditions different from the electric vehicle driven by a single large motor due to the characteristics of the in-wheel motor provided in each wheel.

The above information disclosed in this Background section is only to enhance understanding of the background of the disclosure. Therefore, the Background section may contain information that does not form prior art that is already known to a person having ordinary skill in the art.

SUMMARY OF THE DISCLOSURE

The present disclosure has been made in an effort to solve the above-described problems associated with the prior art while maintaining the above-mentioned advantages achieved by the prior art. It is an object of the present disclosure to provide a sealing device capable of providing excellent sealing force between a rotating body and a stationary body.

Another object of the present disclosure is to provide a sealing device for an in-wheel motor taking into account the characteristics of the in-wheel motor, and the in-wheel motor including the same.

The objects of the present disclosure are not limited to ones mentioned above. Other objects not mentioned herein may be clearly understood by those having ordinary skill in the art to which the present disclosure pertains based on the description below.

In one aspect, the present disclosure provides an in-wheel motor including a stator, a rotor rotatably disposed with respect to the stator, an annular inner seal connected to the stator and spaced apart from the rotor by a predetermined gap so as to be disposed between the stator and the rotor, and an annular slinger coupled to an end portion of the rotor. The annular inner seal may seal between the slinger and the in-wheel motor.

In another aspect, the present disclosure provides a sealing device including a slinger having an annular shape and coupled to a rotatable rotor and including a seal coupled to a stator fixed with respect to the rotatable rotor and including at least two lips brought into contact with the slinger.

Other aspects and embodiments of the disclosure are described below.

It should be understood that the term "vehicle" or "vehicular" or other similar terms as used herein are inclusive of motor vehicles in general. Such motor vehicles may encompass passenger automobiles including sport utility vehicles (SUV), buses, trucks, various commercial vehicles, watercraft including a variety of boats and ships, aircraft, and the like. Such motor vehicles may also include hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example, a vehicle powered by both gasoline and electricity.

The above and other features of the disclosure are described below.

BRIEF DESCRIPTION OF THE DRAWINGS

The above and other features of the present disclosure are described in detail below with reference to certain embodiments thereof illustrated in the accompanying drawings, which are given hereinbelow by way of illustration only, and thus are not limitative of the present disclosure, and in which.

It should be understood that the appended drawings are not necessarily to scale, presenting a somewhat simplified representation of various features illustrative of the basic principles of the disclosure. The specific design features of the present inventive concept as disclosed herein, including, for example, specific dimensions, orientations, locations, and shapes, may be determined in part by the particular intended application and usage environment.

In the figures, identical reference numbers refer to the same or equivalent parts of the present disclosure throughout the several figures of the drawing.

DETAILED DESCRIPTION

Descriptions of specific structures or functions presented in the embodiments of the present disclosure are merely provided for the purpose of explaining the embodiments according to the concept of the present disclosure. The embodiments according to the concept of the present disclosure may be implemented in various forms. In addition, the descriptions should not be construed as being limited to the embodiments described herein, and should be understood to include all modifications, equivalents and substitutes falling within the idea and scope of the present disclosure.

In the present disclosure, terms such as "first" and/or "second" may be used to describe various components, but the components are not limited by the terms. These terms are only used to distinguish one component from another. For example, a first component could be termed a second component, and similarly, a second component could be termed a first component, without departing from the scope of embodiments of the present disclosure.

It should be understood that, when a component is referred to as being "connected to" another component, the component can be directly connected to the other component, or intervening components may also be present. In contrast, when a component is referred to as being "directly connected to" another component, there is no intervening component present. Other terms used to describe relationships between components should be interpreted in a like fashion (e.g., "between" versus "directly between," "adjacent" versus "directly adjacent," etc.).

Throughout the specification, like reference numerals indicate like components. The terminology used herein is for the purpose of illustrating embodiments and is not intended to limit the present disclosure. In this specification, the singular form includes the plural sense, unless specified otherwise. The terms "comprises" and/or "comprising" used in this specification mean that the cited component, step, operation, and/or element does not exclude the presence or addition of one or more of other components, steps, operations, and/or elements.

Hereinafter, the present disclosure is described in detail with reference to the accompanying drawings. When a component, device, element, or the like of the present disclosure is described as having a purpose or performing an operation, function, or the like, the component, device, or element should be considered herein as being "configured to" meet that purpose or perform that operation or function.

Figure 1:
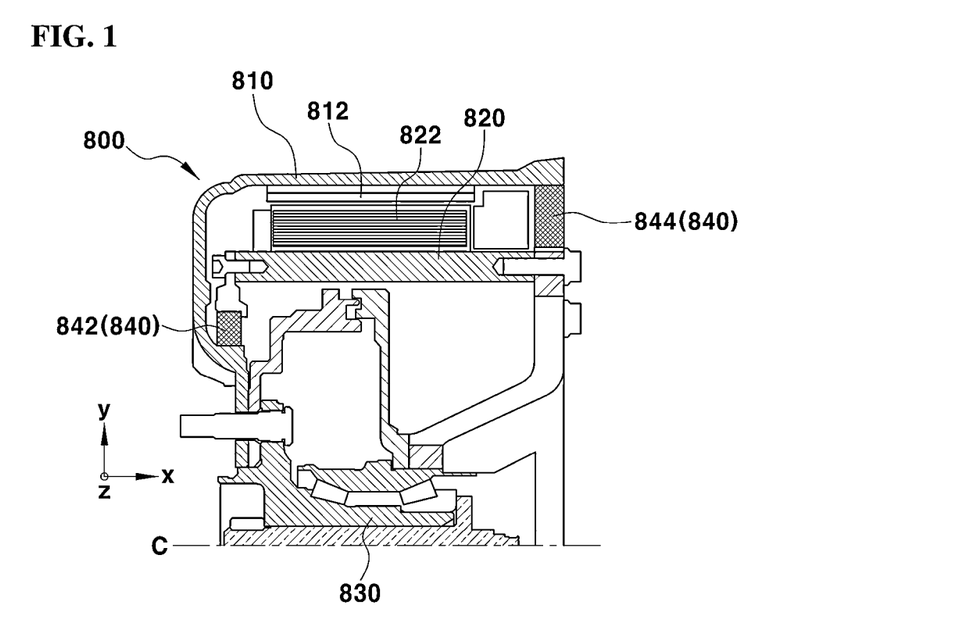
FIG. 1 is a cross-sectional view taken along an axial direction of an example in-wheel motor or x-y plane and depicts half of the in-wheel motor with respect to an axis C of rotation according to some embodiments of the present disclosure.

As illustrated in FIG. 1, an in-wheel motor 800 includes a rotor 810 and a stator 820. The rotor 810 may rotate relative to the stator 820 by electromagnetic interaction between the rotor 810 and the stator 820. In one example, the rotor 810 may include a permanent magnet 812, and the stator 820 may have wound thereon a coil 822. When current is applied to the coil 822 and magnetizes the coil 822, the rotor 810 may rotate by interaction with the permanent magnet 812 while being rotationally supported by a bearing 830.

A seal 840 is provided between the rotor 810 and the stator 820. The seal 840 may include an outer seal 842 disposed at an outer side of the wheel installed on a vehicle and an inner seal 844 located at an inner side of the vehicle with respect to the outer seal 842 when the in-wheel motor 800 is mounted on a wheel of the vehicle. Generally, the inner seal 844 may have a larger diameter than that of the outer seal 842 and may have a diameter similar to that of the rotor 810 or the wheel. The seal 840 may prevent moisture, foreign matters, and the like from penetrating into the in-wheel motor 800.

When the in-wheel motor 800 is installed in the vehicle in this way, particularly when the in-wheel motor 800 is installed in a vehicle including four or more wheels, there are various conditions to be considered in designing the seal 840 due to the characteristics of the in-wheel motor 800 disposed inside the wheel.

First, being mounted on the wheel, the seal 840 is directly exposed to an external environment. In cold climates, the in-wheel motor 800 is exposed to drastic temperature changes during startup. For example, when the outside temperature is about minus 40 degrees Celsius, the in-wheel motor 800 may be exposed to frictional heat of about 160 degrees Celsius once the in-wheel motor 800 is started. In addition, the seal 840 may be directly exposed to vibration, shock, moisture, foreign matters, and the like and may be submerged in water.

Moreover, because the components in which the seal 840 is interposed are made of different materials, the gap between the components may change due to thermal and/or mechanical deformation.

In addition, in an in-wheel motor in which a rotor is placed at an outer side of a stator, a large-diameter seal (e.g., the inner seal 844) is required. For example, when the wheel has a diameter equal to or greater than 16 inches, the outer diameter of the seal 840 should be greater than about 350 mm, and the maximum linear speed of such seal 840 may exceed 30 meters per second. In such an in-wheel motor, excessive friction may occur on the seal 840 due to a high linear speed, which may cause performance degradation of the in-wheel motor 800 and damage to the seal 840.

For this reason, the seal 840 should be made of a material that is dustproof, waterproof and has low friction and low abrasion. Moreover, the seal 840 must be able to withstand the combination of different materials. In addition, the seal 840 must be able to block moisture and foreign matters from entering the in-wheel motor 800 and must be able to discharge condensed water inside the in-wheel motor 800. Further, the seal 840 must have excellent durability so that frequent replacement can be avoided.

Therefore, embodiments of the present disclosure to provide a sealing device for an in-wheel motor having excellent sealing force, which is a basic and essential function of a seal, and optimized for characteristics of an outer-rotor typed in-wheel motor.

Figure 2:
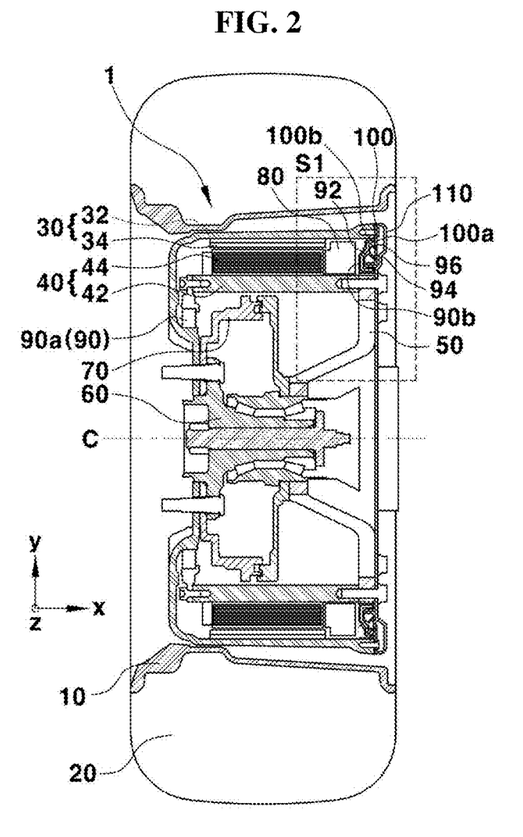
FIG. 2 is a cross-sectional view taken along an axial direction of an in-wheel motor or x-y plane according to some embodiments of the present disclosure.

Referring to FIG. 2, an in-wheel motor 1 according to an embodiment of the present disclosure may be mounted inside a wheel 10 of a vehicle. An x-axis direction denotes a lateral direction of the vehicle, a z-axis direction denotes a longitudinal direction of the vehicle, and a y-axis direction denotes a vertical direction. In addition, in the in-wheel motor 1 of FIG. 2, a left side is an outer side of the vehicle, and a right side is an inner side of the vehicle. Therefore, the in-wheel motor 1 illustrated in FIG. 2 may be regarded as being installed on a wheel on a driver's seat side of the vehicle. A tire 20 is mounted on the wheel 10.

The in-wheel motor 1 may be rotatable within the wheel 10 to directly rotate the wheel 10. To this end, the in-wheel motor 1 includes a rotor 30 which is a rotating portion and a stator 40 which is a fixed portion.

In one embodiment, the in-wheel motor 1 may be an outer-rotor typed motor in which the rotor 30 is disposed radially outwards with respect to the stator 40. The rotor 30 includes a rotor housing 32 and a first magnetic member 34 mounted on the rotor housing 32 to be rotatable with respect to the stator 40. The stator 40 being a fixed portion is connected to the vehicle by a support bracket 50. The stator 40 includes a stator housing 42 and a second magnetic member 44 coupled to the stator housing 42.

In some embodiments, both the first magnetic member 34 and the second magnetic member 44 may be electromagnets in which wires are wound around the rotor 30 and the stator 40 in the shape of a coil, respectively. In some embodiments, one of the first magnetic member 34 and the second magnetic member 44 may be a permanent magnet, and the other may be an electromagnet. For example, the first magnetic member 34 may be a permanent magnet, and the second magnetic member 44 may be an electromagnet. Hereinafter, merely for ease of explanation, it is assumed that the first magnetic member 34 of the rotor 30 is a permanent magnet and the second magnetic member 44 is an electromagnet.

Due to magnetization of the second magnetic member 44 of the stator 40, the first magnetic member 34 and the second magnetic member 44 may interact electromagnetically with each other. The rotor 30 including the first magnetic member 34 is configured to be rotatable about an axis C of the wheel 10 with respect to the stator 40 including the second magnetic member 44. A wheel bearing 60 may couple the wheel 10, the rotor housing 32, and a brake 70 to one another and be rotatable with respect to the stator 40. The brake 70 may be disposed at a radially outer side of the wheel bearing 60 and be operatively coupled to the in-wheel motor 1.

In addition, the in-wheel motor 1 includes a high-temperature and high-voltage portion 80. The high-temperature and high-voltage portion 80 may be located on the stator 40. As a non-limiting example, the high-temperature and high-voltage portion 80 may include a bus bar configured to connect the second magnetic member 44, which is a coil of the stator 40, to a power source, an electric component configured to operate the in-wheel motor 1, and the like. The high-temperature and high-voltage portion 80 is a high-voltage and high-temperature component in the in-wheel motor 1. For example, the temperature of the high-temperature and high-voltage portion 80 may reach about 180 degrees Celsius, and the voltage thereof may reach about 700 volts.

Continuing to refer to FIG. 2, the rotor housing 32 has a first magnetic member 34 disposed at a radially inner side thereof. The first magnetic member 34 has the stator housing 42, on which the second magnetic member 44 is wound, disposed at a radially inner side of the first magnetic member 34. In an example, the rotor 30 and the stator 40 have a gap therebetween. At a radially inward side of the stator 40, the wheel bearing 60 and the brake 70 are disposed coaxially with the stator 40. The wheel bearing 60 and the brake 70 may be coupled to the rotor housing 32 to rotate together with rotation of the wheel 10. The rotor housing 32 has one end portion closed except the central portion thereof. At the other end portion of the rotor housing 32, the support bracket 50 connected to the vehicle is inserted into the stator 40 and coupled to the wheel bearing 60. After the rotor 30 is coupled to the stator 40, sealing is required between the rotor 30 and the stator 40.

In an example, the in-wheel motor 1 is sealed by a sealing device or an annular seal 90. More specifically, a space between the rotor 30 and the stator 40 is sealed by the seal 90 in both the x-axis direction or the axial direction of the rotor 30 and the stator 40. In one embodiment, the seal 90 includes an outer seal 90a disposed at an outer side of the vehicle in the lateral direction (x-axis direction) and an inner seal 90b disposed closer to the central portion of the vehicle than the outer seal 90a. As a non-limiting example, the seal 90 may be made of rubber. The inner seal 90b may include an internal structure 92 to maintain the shape of the inner seal 90b. As a non-limiting example, the structure 92 may be made of steel. The structure 92 may have a shape similar to that of the inner seal 90b and extend along the interior of the inner seal 90b.

According to an embodiment of the present disclosure, a sealing device may have a configuration as follows so that the inner seal 90b disposed adjacent to the high-temperature and high-voltage portion 80 satisfies the above-described design conditions.

Figure 3:
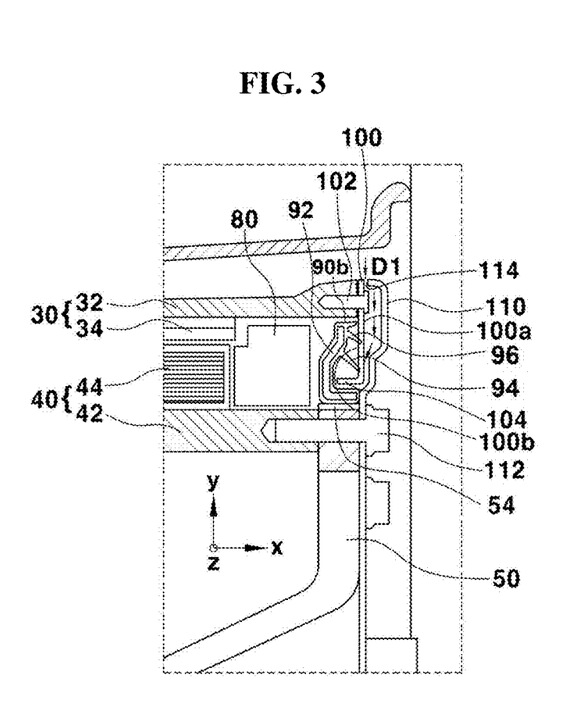
FIG. 3 illustrates a portion 51 of FIG. 2 according to some embodiments of the present disclosure.

As illustrated in FIG. 3, the inner seal 90b may be connected to the stator 40. In some embodiments, the inner seal 90b may be connected to the stator 40 using the support bracket 50. In some embodiments, the inner seal 90b and the support bracket 50 may be assembled or integrated into one module, and the module may be attached to the stator 40. For example, the inner seal 90b having an annular shape may be fixed to an outer circumferential portion 54 of the support bracket 50. More specifically, an inner circumferential portion 98 of the inner seal 90b may be assembled to the outer circumferential portion 54 of the support bracket 50 to allow the inner seal 90b and the support bracket 50 to be integrated with each other.

With this configuration, the space occupied by the inner seal 90b and the support bracket 50 in the in-wheel motor 1 may be minimized, thereby securing more space for the inner space of the in-wheel motor 1 and the space connected by a chassis of the vehicle. For example, connection to the bus bar located inside the in-wheel motor 1 or connection to a suspension located outside the in-wheel motor 1 may be further facilitated.

The inner seal 90b is mounted on the stator 40 to have a gap G of a predetermined distance from the rotor 30. The gap G allows the rotor 30 to rotate smoothly without interference. However, because moisture, foreign matters, etc., may be introduced into the in-wheel motor 1 through the gap G, a slinger 100 having an annular shape is mounted on the rotor 30. The slinger 100 may directly block the gap G and extend the movement passage of moisture or foreign matters introduced from the outside, thereby preventing the moisture or foreign matters from being introduced into the in-wheel motor 1.

The slinger 100 is coupled to an end portion of the rotor 30. The slinger 100 extends in a circumferential direction of the rotor 30 and extends radially inwards of the rotor 30 to extend between the rotor 30 and the stator 40. Accordingly, the slinger 100 at least partially overlaps with the inner seal 90b interposed between the rotor 30 and the stator 40 in the radial direction.

The slinger 100 is coupled to the rotor housing 32 using a fastening member 102. As a non-limiting example, the fastening member 102 may be a bolt. The slinger 100 is coupled to the rotor 30 through the fastening member 102, thereby reinforcing the rigidity of the rotor 30 and facilitating disassembly and assembly of the slinger 100. Therefore, the slinger 100 is recyclable, reduces associated costs, and is environmentally friendly. Moreover, because the slinger 100 can be easily detached and assembled by the fastening member 102, maintenance may be facilitated. In addition, the slinger 100 is made of a steel material having high thermal conductivity and is coupled to the end portion of the rotor 30 or coupled outside the space between the rotor 30 and the stator 40. Accordingly, heat due to contact friction with the inner seal 90b can be easily dissipated to the outside, thereby suppressing temperature rise of the inner seal 90b adjacent to the high-temperature and high-voltage portion 80. As cooling of the inner seal 90b is facilitated, deformation and deterioration of the seal may be suppressed, and durability of the inner seal 90b may be improved. Also, because the inner seal 90b made of rubber or resin is positioned between the high-temperature and high-voltage portion 80 and the slinger 100 made of steel and serves as an insulator, internal discharge may be prevented.

In one embodiment, the slinger 100 may include a bent portion 104. As described above, the slinger 100 generally extends in the y-axis direction or in the radial direction of the in-wheel motor 1 but has an end portion having the bent portion 104 bent towards the inner seal 90b. As will be described below, the bent portion 104 may extend the movement passage of foreign matters introduced into the in-wheel motor 1.

Figure 4:
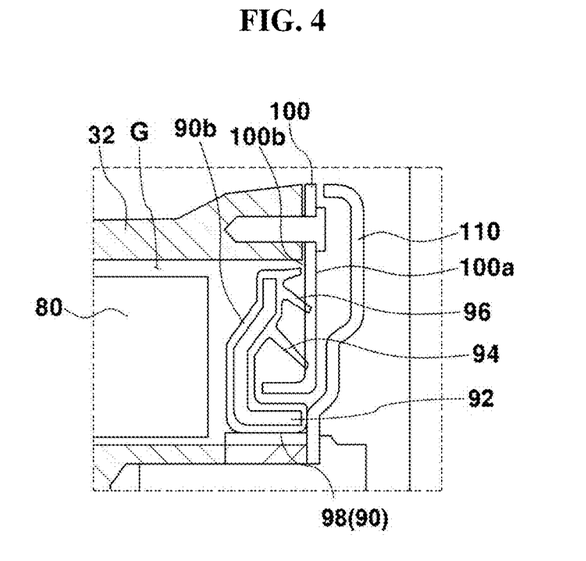
FIG. 4 is a partially enlarged view of FIG. 3 according to some embodiments of the present disclosure.

According to an embodiment of the present disclosure, with additional reference to FIG. 4, the seal 90 or the inner seal 90b includes at least two lips 94, 96. In one embodiment, the seal 90 may have an upstream lip 94 and a downstream lip 96. The upstream lip 94 is disposed upstream in an intruding direction D1 of foreign matters or the like, and the downstream lip 96 is disposed downstream with respect to the upstream lip 94. The two lips 94, 96 may additionally prevent inflow of foreign matters in addition to a labyrinthian structure described below.

At least one of the lips 94, 96 may be disposed to be arranged to contact with the slinger 100. In some embodiments, only one of the upstream lip 94 and the downstream lip 96 may contact with the slinger 100. For example, the upstream lip 94 may be in contact with the slinger 100, and the downstream lip 96 may be disposed to only contact the slinger 100 with zero overlap or clamping or disposed not to contact the slinger 100. Alternatively, a case opposite thereof is possible. In some embodiments, both the upstream lip 94 and the downstream lip 96 may be disposed to be brought into contact with the slinger 100.

In one embodiment, the lips 94, 96 may be oblique towards the center of the in-wheel motor 1 to be brought into contact with the slinger 100. For example, the lips 94, 96 are disposed to be inclined towards the intruding direction D1 of foreign matters or the like. The lips 94 and 96 have such shapes not to be easily bent in the intruding direction D1, thereby preventing easy entry of foreign matters.

According to an embodiment of the present disclosure, both the lips 94, 96 face outwards in the axial direction (x-axis direction) of the in-wheel motor 1. Because the slinger 100 is disposed at the end portion of the in-wheel motor 1, the lips 94, 96 may face outwards in the axial direction of the in-wheel motor 1. Accordingly, the lips 94, 96 are disposed on a side opposite the high-temperature and high-voltage portion 80 of the in-wheel motor 1, thereby reducing heat transfer of the high-temperature and high-voltage portion 80 and allowing heat due to seal friction to be more easily dissipated. Because the distance between the high-temperature and high-voltage portion 80 and the lips 94, 96 increases, heat transfer inside the in-wheel motor 1 may be suppressed, and cooling of the inner seal 90b may be improved to thereby suppress deformation and deterioration of the inner seal 90b and improve durability.

The slinger 100 may have an outer side at which a dust cover 110 is disposed. The dust cover 110 is coupled to the stator 40. For example, the dust cover 110 is coupled to the stator housing 42. The dust cover 110 may be coupled to the stator 40 through a fastening member 112, such as a bolt. Because the dust cover 110 is detachably coupled to the stator 40 by the fastening member 112, disassembly and assembly may be facilitated, thereby facilitating maintenance. In addition, as the dust cover 110 is recyclable, costs can be reduced and the dust cover 110 is environment-friendly.

The dust cover 110 is coupled to the in-wheel motor 1 at the outside of the inner seal 90b and the slinger 100, thereby preventing the inner seal 90b and the slinger 100 from being separated from the in-wheel motor 1. In other words, the dust cover 110 may serve as a stopper to prevent the inner seal 90b from being pushed out of the in-wheel motor 1 and improve durability by providing improved fixing force to the inner seal 90b.

The dust cover 110 includes a passage 114. The passage 114 may be a small gap between the circumference of the dust cover 110 and the slinger 100. The passage 114 may allow foreign matters introduced into the dust cover 110 to be re-discharged and may also provide a labyrinthian structure to the sealing device.

In an embodiment, inflow of foreign matters, such as moisture, into the in-wheel motor 1 may be primarily blocked by the dust cover 110. Because the slinger 100 extends in the radial direction of the in-wheel motor 1, when foreign matter is introduced into the dust cover 110 through the passage 114, the foreign matter may not be able to move in the axial direction of the in-wheel motor 1 but moves in the intruding direction D1. Even if foreign matters reach the space between the inner seal 90b and the slinger 100, further penetration is impossible because of the lips 94, 96. In addition, according to embodiments of the present disclosure, because the inner seal 90b includes at least two lips, i.e., the upstream lip 94 and the downstream lip 96, even if the upstream lip 94 is damaged, inflow of foreign matters may be secondarily blocked by the downstream lip 96. In addition, as the in-wheel motor 1 rotates, the introduced foreign matter may move in a direction opposite the intruding direction D1 and be re-discharged outside the dust cover 110.

According to an embodiment of the present disclosure, the sealing device may further include a structure enabling heat dissipation for the sliding heat generated when the seal 90 rotates. When heat dissipation of the seal 90 is not smoothly achieved, the temperature may rise rapidly due to the lubricating failure of the sliding portion when the heat resistance temperature of materials, such as lip, grease, etc., is exceeded, which may cause damage to the seal 90. However, the sealing device according to embodiments of the present disclosure enables effective cooling of the seal 90. Further, embodiments of the present disclosure may eliminate the possibility of weakening heat dissipation that may occur when a labyrinthian structure using the inner seal 90b, the slinger 100, and the dust cover 110 are used.

Figure 5:
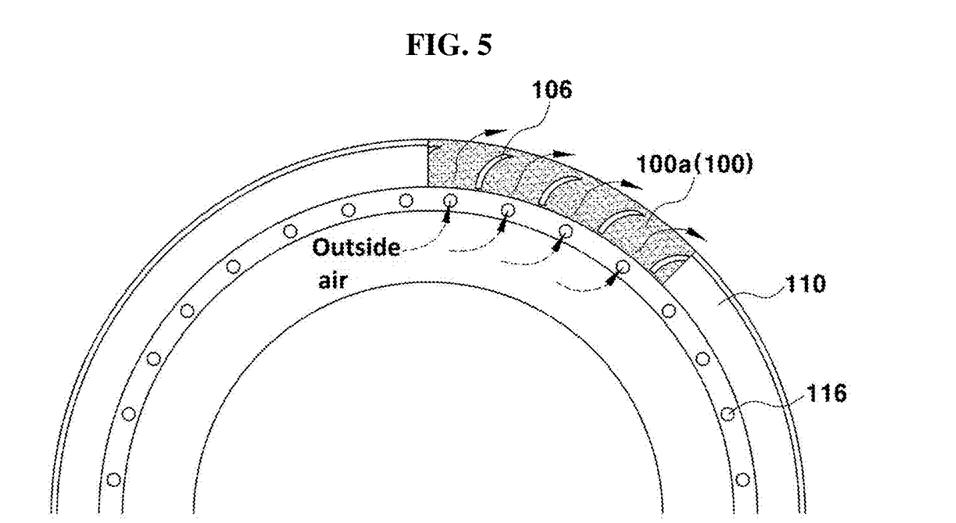
FIG. 5 illustrates a slinger and a dust cover of an in-wheel motor according to some embodiments of the present disclosure.
Figure 6:
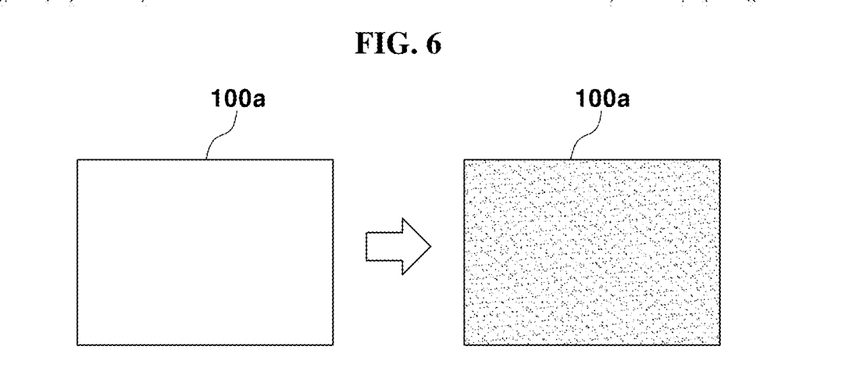
FIG. 6 illustrates a surface state of an opposing side of a slinger according to some embodiments of the present disclosure.
Figure 7:
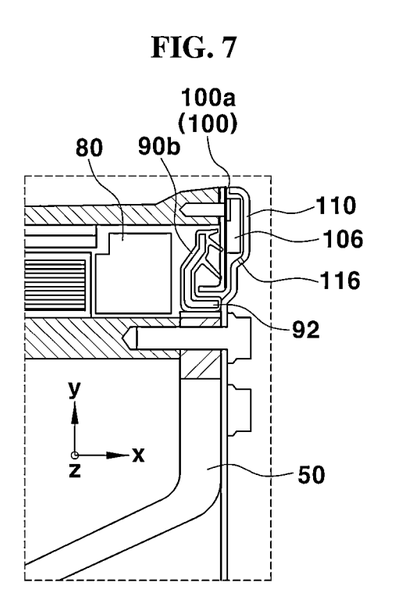
FIG. 7 illustrates a slinger and a dust cover of an in-wheel motor according to some embodiments of the present disclosure.

Referring to FIGS. 5-7, according to an embodiment, the slinger 100 may be surface treated. For example, an opposing surface 100a of the slinger 100 facing the dust cover 110 may be surface treated to have a surface roughness greater than or equal to a predetermined value. A sliding surface 100b, which is a surface in contact with the lips 94 and 96, may not be treated. In an embodiment, as illustrated in FIG. 6, the opposing surface 100a of the slinger 100 facing the dust cover 110 is configured to have a large surface roughness. As a non-limiting example, the surface roughness of the opposing surface 100a of the slinger 100 facing the dust cover 110 may be increased through sand blasting.

The increased roughness of the opposing surface 100a of the slinger 100 facing the dust cover 110 may increase the heat dissipation surface area of the slinger 100, thereby improving the convective heat transfer coefficient. Accordingly, the heat dissipation efficiency may be increased and eventually temperature rise of the seal 90 may be suppressed. In addition, the maximum operating temperature of the inner seal 90b may be decreased to thereby suppress deformation and deterioration of the inner seal 90b, and thus durability of the inner seal 90b may be improved.

In some embodiments, the surface 100a of the slinger 100 facing the dust cover 110 may have formed thereon a plurality of vanes 106 configured to accelerate ventilation and suppress inflow of foreign matters. The vanes 106 may be spaced apart from each other at predetermined distances in a circumferential direction of the slinger 100.

According to embodiments of to the present disclosure, the opposing surface 100a, which is a surface in contact with outside air, of the slinger 100 facing the dust cover 110 has formed thereon the vanes 106, thereby implementing centrifugal pumping. The presence of the vanes 106 may suppress the inflow of foreign matters into the space between the slinger 100 and the dust cover 110 and facilitate discharge of the introduced foreign matters. The vanes 106 may stimulate ventilation and accelerate internal heat dissipation in the in-wheel motor 1. The accelerated heat dissipation suppresses the temperature rise of the seal 90 and reduces the maximum operating temperature of the seal 90, thereby suppressing deformation and deterioration of the seal 90 and improving durability. In addition, rotation of the vanes 106 may suppress the inflow of foreign matters into the dust cover 110 and facilitate discharge of the foreign matter.

According to an embodiment of the present disclosure, the dust cover 110 may include a vent hole 116. A plurality of vent holes 116 may be provided in a circumferential direction of the dust cover 110.

The vent holes 116 may facilitate inflow of outside air so that ventilation may be actively performed. Accordingly, the vent holes 116 may smoothly dissipate heat from the in-wheel motor 1 and prevent temperature rise of the seal 90.

According to embodiments of the present disclosure, the movement passage of foreign matter has a complicated shape like a labyrinth formed by the dust cover 110 including the bent portion 104, the slinger 100, and the inner seal 90b, and thus may substantially block the inflow of foreign matter and provide excellent sealing force. In addition, because the labyrinthian structure starts from the dust cover 110 and implements filtering, sealing performance may be improved. Accordingly, sealing burden on the lips 94, 96 may be reduced and thus friction may be further reduced.

Generally, a seal of an in-wheel motor is disposed close to high temperature and high voltage components such as the high-temperature and high-voltage portion 80 because of the structure of the in-wheel motor 1 and is exposed to very high temperature. When the seal has a large diameter, the seal may experience frictional heat and wear due to high circumferential speed. However, in the sealing device according to embodiments of the present disclosure, the lips 94, 96 of the inner seal 90b are disposed to face away from the high-temperature and high-voltage portion 80, thereby preventing damage caused by temperature and effectively responding to frictional heat and abrasion caused by high circumferential speed. According to embodiments of the present disclosure, it is possible to effectively cope with heat generation due to motor losses, such as copper loss, magnet loss, and iron loss.

According to embodiments of the present disclosure, the inner seal 90b is disposed between the high-temperature and high-voltage portion 80, which is a high voltage part, and the slinger 100 made of steel, thereby blocking electrostatic discharge against steel components, such as the slinger 100 and providing excellent insulation against the internal high voltage of the in-wheel motor 1.

According to embodiments of the present disclosure, the sealing device may support the rotor 30 having a large diameter and suppress deformation of the rotor 30 by utilizing the slinger 100 as a structure.

According to embodiments of the present disclosure, because the inner seal 90b and the support bracket 50 may be modularized, extra space may be provided to the in-wheel motor 1 having a small space.

Additionally, the sealing device according to embodiments of the present disclosure has excellent heat dissipation performance against sliding heat generation.

Although the sealing device according to embodiments of the present disclosure has been described above as being adopted only in the in-wheel motor, the sealing device may also be adopted in a space between any stator and a rotor where a sealing device is needed.

As is apparent from the above description, embodiments of the present disclosure provide the following effects.

According to embodiments of the present disclosure, a sealing device capable of providing excellent sealing force is provided.

According to embodiments of the present disclosure, a sealing device optimized for characteristics of an in-wheel motor and an in-wheel motor including the same are provided.

Effects of the present disclosure are not limited to the ones described above, and other effects not mentioned herein may be clearly recognized by those having ordinary skill in the art based on the above description.

In the above, embodiments of the present disclosure have been described with reference to the accompanying drawings. However, those having ordinary skill in the art to which the present disclosure pertains should understand that various modifications may be made therefrom, and that all or part of the above-described embodiment(s) may be selectively combined. Therefore, the true technical protection scope of the present disclosure should be determined by the technical ideas of the appended claims.

What is claimed is:

1. An in-wheel motor, comprising:
   a stator;
   a rotor rotatably disposed with respect to the stator;
   an annular inner seal connected to the stator and disposed between the stator and the rotor; and
   an annular slinger detachably coupled to the rotor,
   wherein the annular inner seal is configured to seal between the annular slinger and the in-wheel motor.

2. The in-wheel motor according to claim 1, wherein the stator is disposed at a radially inner side of the rotor.

3. The in-wheel motor according to claim 2, wherein:
   the annular inner seal comprises one of i) a lip or ii) two or more lips spaced a predetermined distance from each other, and
   the annular slinger is disposed at an outer side of the annular inner seal with respect to an axial direction of the rotor, wherein at least one lip is arranged to have contact with the annular slinger.

4. The in-wheel motor according to claim 3, wherein the annular slinger is configured to extend radially inwards towards the rotor to be contactable with the at least one lip.

5. The in-wheel motor according to claim 1, further comprising a dust cover coupled to the stator and disposed at an outer side of the annular slinger with respect to an axial direction of the rotor.

6. The in-wheel motor according to claim 5, wherein the dust cover comprises a passage configured to communicate with an inner portion of the dust cover.

7. The in-wheel motor according to claim 5, wherein the dust cover is detachably coupled to the stator.

8. The in-wheel motor according to claim 1, wherein an electric component configured to operate the in-wheel motor is disposed inside the annular inner seal with respect to an axial direction of the rotor.

9. The in-wheel motor according to claim 8, wherein the annular inner seal comprises at least two lips that face away from the electric component.

10. The in-wheel motor according to claim 1, wherein the annular slinger comprises a bent portion bent towards the annular inner seal.

11. The in-wheel motor according to claim 1, wherein:
the rotor and the stator each comprise a first magnetic member and a second magnetic member, wherein at least one of the first magnetic member and the second magnetic member is a magnetizable electromagnet, and
the rotor further comprises a rotor housing having the first magnetic member mounted in the rotor housing, and the stator further comprises a stator housing having the second magnetic member mounted in the stator housing.

12. The in-wheel motor according to claim 1, further comprising a support bracket coupled to the stator in an axial direction,
wherein the annular inner seal is supported by the support bracket.

13. The in-wheel motor according to claim 12, further comprising:
a brake disposed at a radially inner side of the stator and coupled to the support bracket; and
a wheel bearing disposed at a radially inner side of the brake and configured to rotatably support the rotor with respect to the stator.

14. The in-wheel motor according to claim 1, wherein the in-wheel motor:
has a first end side having the annular inner seal disposed on the first end side, and
has a second end side having an outer seal disposed on the second end side.

15. The in-wheel motor according to claim 1, wherein the in-wheel motor is operatively coupled to a wheel of a vehicle.

16. A sealing device comprising:
a slinger having an annular shape and coupled to a rotatable rotor;
a seal, coupled to a stator fixed with respect to the rotatable rotor and comprising at least two lips brought into contact with the slinger; and
a dust cover detachably coupled to the stator and disposed at outer sides of the seal and the slinger in an axial direction of the rotatable rotor.

17. The sealing device according to claim 16, wherein the slinger is coupled to an end portion of the rotatable rotor, and the seal is disposed at an inner side of the slinger in the axial direction of the rotatable rotor.

18. The sealing device according to claim 16, wherein the dust cover comprises a passage configured to communicate with an inner portion of the dust cover.

19. The sealing device according to claim 16, wherein the slinger has an opposing surface facing the dust cover, and wherein an opposing surface of the slinger has a higher surface roughness than other portions of the slinger.

20. The sealing device according to claim 16, wherein an opposing surface of the slinger facing the dust cover has a plurality of vanes provided in a circumferential direction of the slinger.

21. The sealing device according to claim 16, wherein the dust cover includes a plurality of vent holes formed in a circumferential direction of the dust cover.

22. A sealing device comprising:
a slinger having an annular shape and coupled to a rotatable rotor;
a seal, coupled to a stator fixed with respect to the rotatable rotor and comprising one or more lips brought into contact with the slinger; and
a dust cover disposed at outer sides of the seal and the slinger in an axial direction of the rotatable rotor, wherein the dust cover comprises a passage configured to communicate with an inner portion of the dust cover.

* * * * *